A. J. TINGLEY & G. GOULD.
WINDROWING AND BUNCHING MACHINE.
APPLICATION FILED JULY 17, 1912.
1,119,475.
Patented Dec. 1, 1914.
5 SHEETS—SHEET 5.
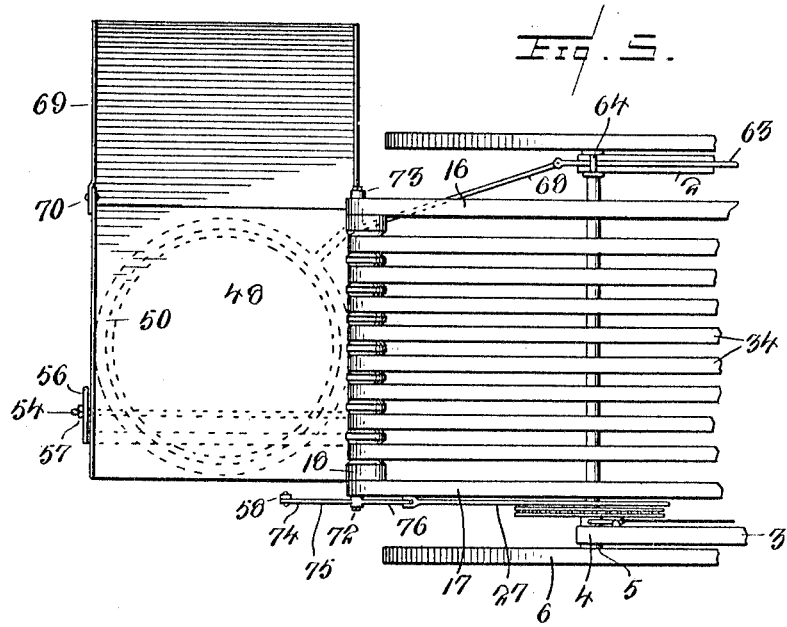
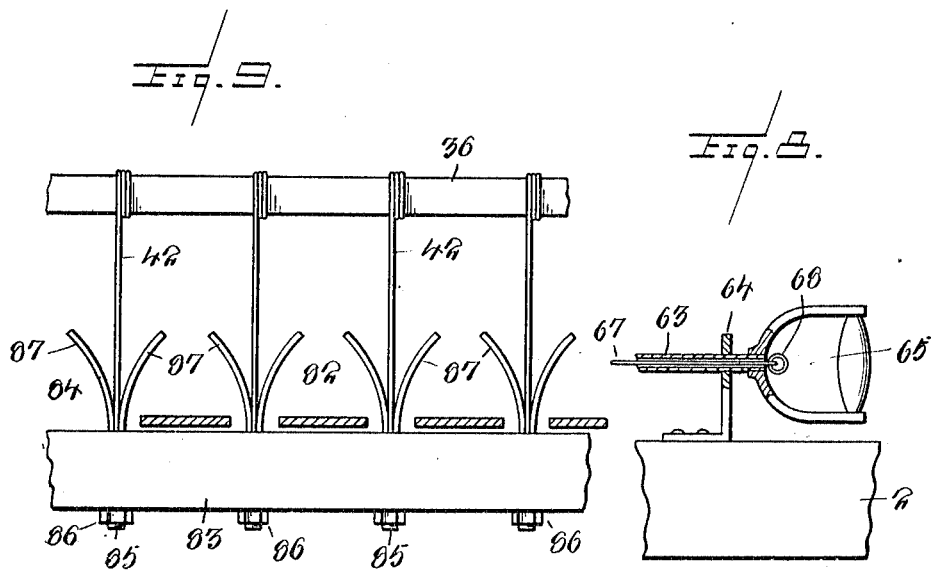

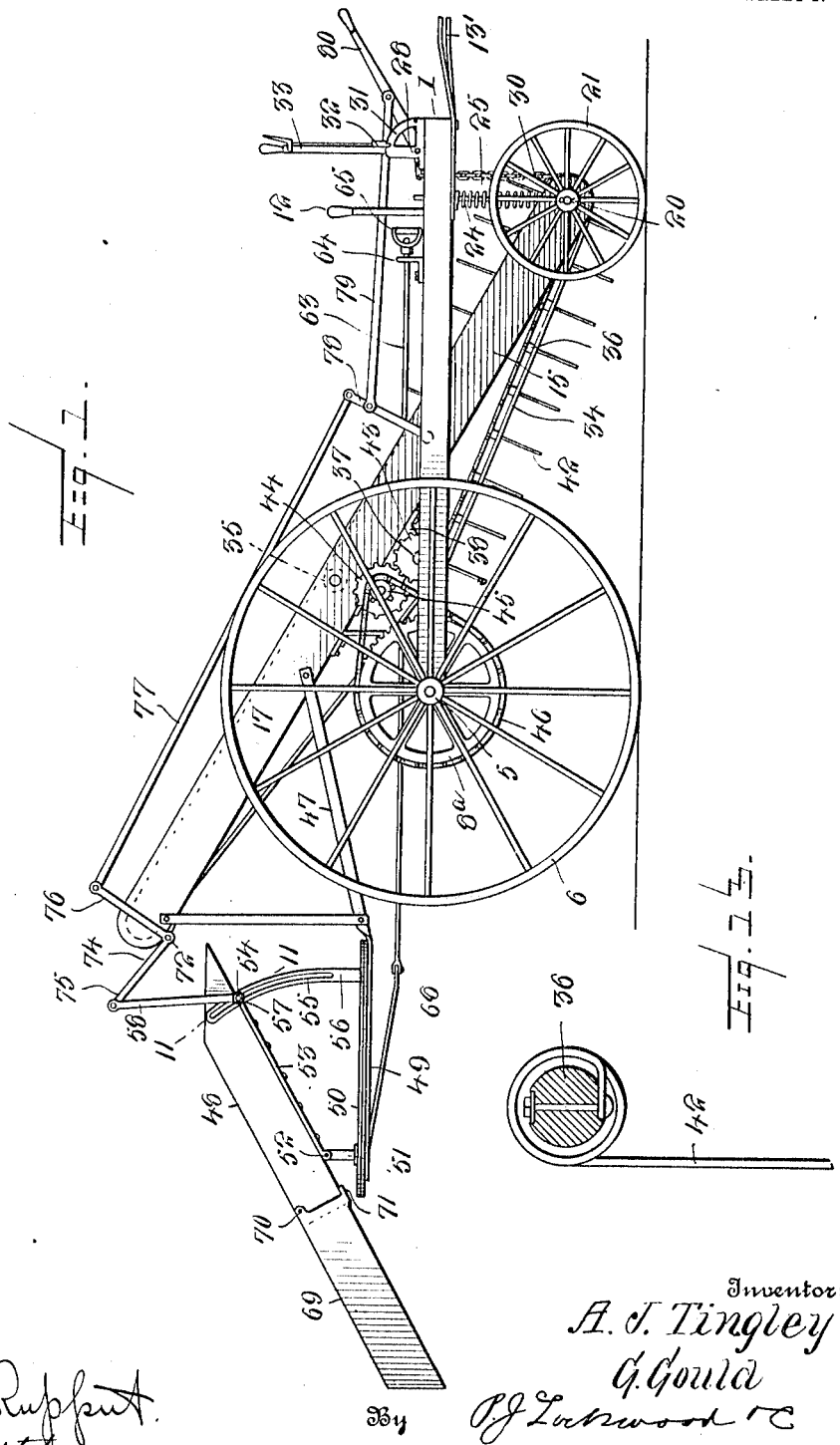

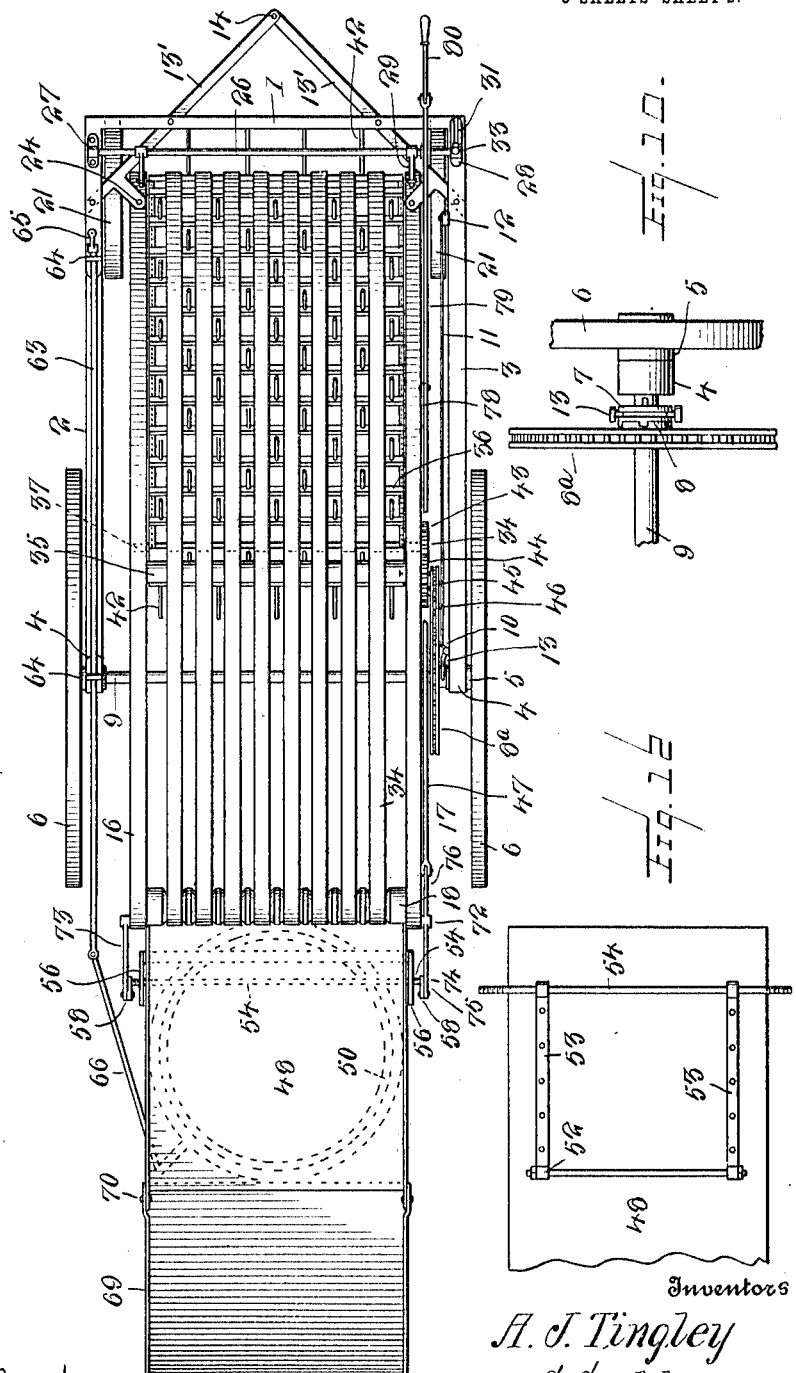

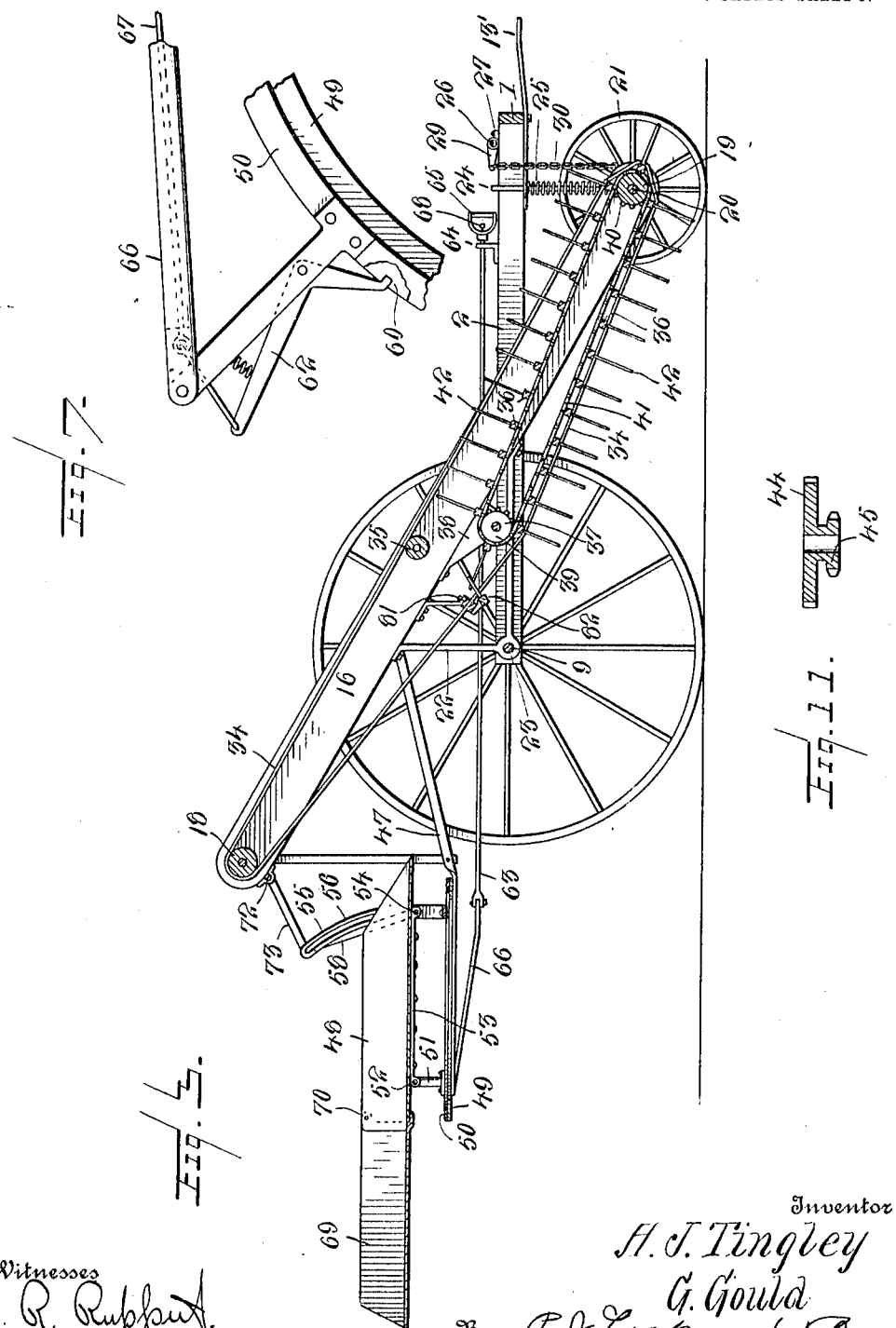

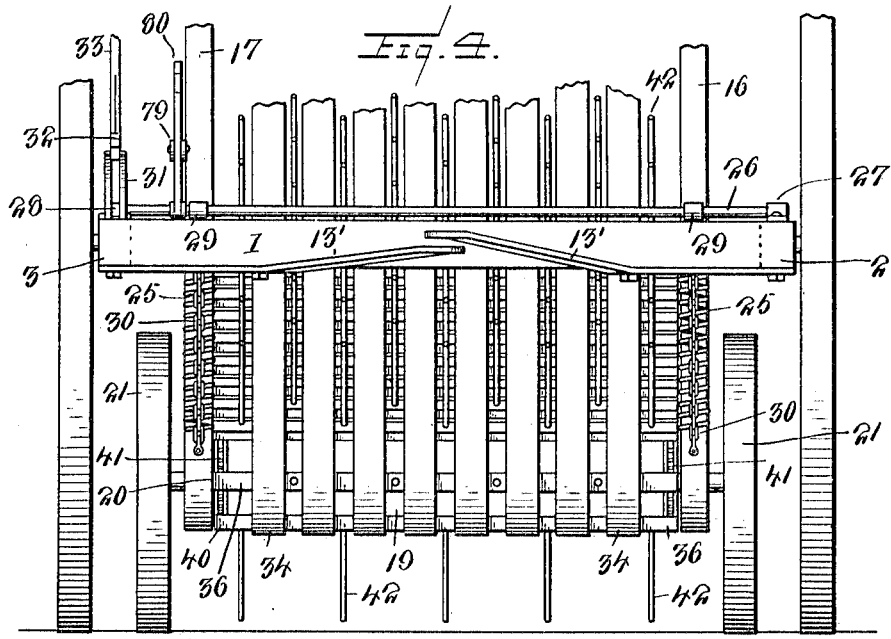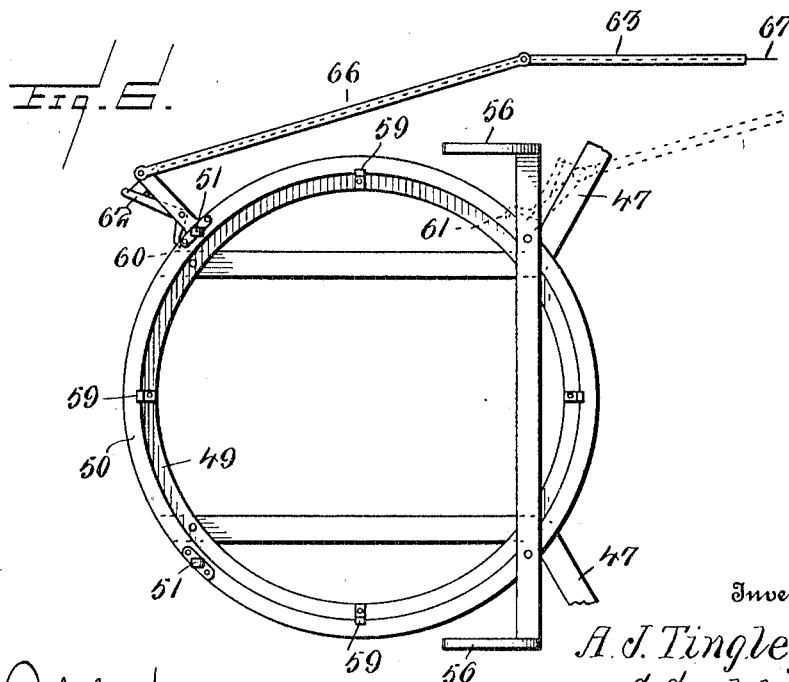

UNITED STATES PATENT OFFICE.

ALLEN J. TINGLEY AND GLENN GOULD, OF OWOSSO, MICHIGAN.

WINDROWING AND BUNCHING MACHINE.

1,119,475.         Specification of Letters Patent.         Patented Dec. 1, 1914.

Application filed July 17, 1912. Serial No. 709,887.

*To all whom it may concern:*

Be it known that I, ALLEN J. TINGLEY and GLENN GOULD, citizens of the United States, residing at Owosso, in the county of Shiawassee and State of Michigan, have invented certain new and useful Improvements in Windrowing and Bunching Machines, of which the following is a specification.

This invention relates to a machine for forking out, windrowing and bunching beans, peas, and other similar crops.

An object of the invention is to provide a machine of this character which may be driven across a field behind a bean puller to effectually collect and bunch or windrow the beans as they are withdrawn from the ground and to employ in the construction of said machine, means whereby the same can be conveniently connected with or disconnected from the puller.

Another object of the invention is to provide a machine which will include a distributing chute that will be adjustable so that, at the desire of the operator, many rows of beans can be placed one on top of another. In other words should the crop be green, the operator may windrow the beans by driving once across the field, gathering two rows and through a prior adjustment of the chute to one position; the beans will be dropped directly behind the machine. He then adjusts the chute to another position and drives down the next two rows whereby the beans subsequently collected can be deposited directly upon those first deposited. The machine can then be driven down the two rows on opposite side of windrow, whereupon, the beans will be picked up, forked out and finally deposited on the windrow so that six rows of beans will be placed in one windrow.

Another object of the invention is to provide means which will positively prevent any dragging back of the beans, said means including a forked collecting belt and a carrier, the latter being associated with the former whereby at a predetermined position of the collected material, the forks will gradually adjust themselves to released positions from the material, permitting the latter to continue on its journey to the distributing chute without its movement being resisted or opposed by the forks on the return of the latter to collecting positions.

Another object of the invention is to provide means for yieldingly holding the effective collecting end of the machine associated with its work so as to insure a positive collection of the material.

A still further object of the invention is to provide means whereby the collecting end of the machine can be elevated above the ground to permit the machine to turn readily at the end of the row.

A still further object of the invention is to provide a machine wherein the carrier or conveyer will comprise spaced endless belts, collecting forks movable in the spaces between the belts, and means for maintaining a proper position of the forks and for straightening them should they become casually distorted while in movement.

Other objects of the invention are to provide a machine that can be quickly converted from a windrower to a buncher; one which will possess the maximum degree of efficiency and of minimum simplicity; and one which will be strong, light and durable.

In the drawing forming a portion of this application, and in which like letters of reference indicate similar parts in the several views:—Figure 1 is a side view of the machine showing the chute tilted to windrow the material. Fig. 2 is a top plan view of the machine. Fig. 3 is a vertical longitudinal section through the machine showing the chute in bunch forming position. Fig. 4 is a front view of the machine. Fig. 5 is a top plan view of a portion of the machine showing another adjusted position of the chute. Fig. 6 is a top plan view of the turn table showing the locking and actuating means therefor. Fig. 7 is a plan view on an enlarged scale of a portion of the turntable and the locking and actuating means therefor. Fig. 8 is a section through the controlling lever for the locking and actuating means of the turn table. Fig. 9 is a side view of the tooth straightening means. Fig. 10 is a section through axle showing the wheel driven clutch element thereon. Fig. 11 is a section through the driven gear wheel for the carrier. Fig. 12 is a bottom plan view of the platform. Fig. 13 is a section through one of the cross slats.

The machine herein designed for performing the functions previously stated comprises a draft frame of substantially U-form; having a front bar 1 and integral rearwardly extending spaced side bars 2 and 3 which, terminally present bearings 4 for the hubs 5 of supporting wheels 6, the wheel on the right of the machine having a clutch element 7 which may be moved into engagement with a co-acting clutch element 8 upon a large driving gear wheel 8ª on the axle 9 for said supporting wheels. A rocking lever 10 on the bar 3 has connection with one end of an actuating rod 11, while the opposite end of said rod is connected with a suitable adjusting lever 12, the latter being mounted on the bar 3, near the front of the machine. The rocking lever 10 has its branch 13 associated with the adjustable clutch element 7 whereby movements of the latter can be influenced through adjustments of the lever 12. Draft links 13' have their rear ends rigidly secured to the front bar 1 and the side bars 2 and 3, while the front ends of said links are extended forwardly beyond the front bar 1 and disposed in line with the longitudinal center of the machine and perforated at 14 for the reception of a connecting pin, not shown, whereby the machine can be connected with a bean puller immediately behind the same.

A carrier frame 15 is mounted between the side bars 2 and 3, being extended downwardly and forwardly whereby its effective receiving end will be disposed in operative proximity with the ground. The carrier frame comprises spaced side bars 16 and 17 which are connected together at their upper rear ends by an idle belt roller 18 and at their lower front ends by a driven belt roller 19. An axle 20 extends through the roller 19, serving as a support therefor, and as shown, said axle finds bearings in the lower front ends of the bars 16 and 17, while the extremities of the axle support small ground wheels 21. Bearing brackets 22 on the side bars 16 and 17 have bearings 23 which receive the axle 9 whereby the carrier is mounted for vertical tilting movements. Rods 24 on the bars 16 and 17 are mounted for sliding movements in the bars 2 and 3, said rods being passed through springs 25 which latter have such association with the first and second named bars, that the front end of the carrier frame is yieldingly held against its work, thereby maximizing the collection of the material as the machine is drawn over the field. A rocking shaft 26 is mounted in bearings 27 and 28 upon the bars 2 and 3 respectively, said shaft having crank arms 29 which are connected with elevating chains 30. These chains are connected with the forward ends of the bars 16 and 17 so that when the shaft 26 is rocked, adjustments of the carrier will be effected. The bearing 28 has an integral rack segment 31 which co-acts with a locking pawl 32 on the adjusting lever 33 of the shaft 20.

Spaced conveying belts 34 are passed over the rollers 18 and 19 and over an idle sustaining roller 35 of the carrier frame and over the cross-slats 36 of a forking out, collecting, and feeding member. A driven shaft 37 is mounted in bearings 38 of the bars 16 and 17, and mounted on said shaft are sprocket gear wheels 39 which are connected with similar sprocket gear wheels 40 on the roller 19 by chain belts 41, to which latter are secured the cross-slats 36. The bearings 38 are disposed below the plane of the lower longitudinal edges of the bars 16 and 17 whereby the collecting and feeding member will be arranged substantially diagonally to and below the plane of the upper runs of the belts 34. The rear of the feeding and collecting member terminates at about the center of the belts 34 for a purpose to be hereinafter explained. Each cross-slat 36 is provided with spaced resilient right angularly extending forks 42, which through the relation of the belts 34 with the feeding and collecting member, are adapted to project for various distances through the spaces between said belts and above the latter. In this manner, the greatest projection of the forks will occur at the front of the machine, gradually diminishing in a rearward direction during the operation of the machine, whereby, in effect, the teeth are gradually withdrawn in a downward direction from the material carried by said belts 34, and as a consequence, dragging back of the material will be entirely eliminated. Power is supplied to the collecting and feeding member by means of a gear wheel 43 on the shaft 37, an intermeshing gear wheel 44, a driven sprocket wheel 45, the latter being an integral part of the wheel 44 and being connected through the medium of the driving chain 46 with the large driving gear wheel 8ª.

Bracket arms 47 are secured to the side bars 16 and 17 of the carrier frame, said arms being terminally extended beyond the end of the carrier belts and disposed below the discharge ends of said belts, whereby to operatively support the material receiving platform 48 in immediate proximity thereto to receive the material as the same is discharged from the belts. A circular track 49 which is carried by the bracket arms 47 rotatably supports a turn table 50, and as illustrated posts 51 which rise from said turntable have pivotal connection at 52 with straps 53 secured to the underside of the platform. A rod 54 extends through said straps and through guide slots 55 in arcuate members 56 upon the turn table. The terminals of the rod 54 are threaded for the reception of clamping nuts 57, the latter being associated with the lower ends of links 58 and being also adapted for clamping engagement with the members 56 for a purpose to be hereinafter described. Retaining guides 59 upon the track 49 are relatively arranged with the turntable to hold the latter against lateral shifting upon the track.

From the construction of the platform described, it is evident that the same is capable of being tilted or rotated as the occasion may demand.

Means for holding the platform against rotation comprises peripheral recesses 60 and 61 in the track 49 and a locking dog 62 the latter being pivotally connected with a fixed radial crank arm upon the turntable, while the recesses are disposed directly in the path of the dog to interchangeably receive the same whereby the platform may be held fixed in a plane at right angles to the carrier or in a longitudinal plane therewith. A shifting rod 63 mounted to slide in guide 64 upon the bar 2 has its forward end provided with a hand grip 65, while the opposite end of said rod is connected with an actuating link 66, the latter being pivoted to the crank arm of the turntable, whereby the latter may be revolved when shifting motion is imparted to the rod 63. The rod 63 is of hollow tubular construction and slidably mounted therein is a releasing element 67. Said element has one end connected with the tail of the dog 62, while the opposite end thereof has a finger-piece 68 disposed within the grip 65 to permit of its being engaged by one finger of that hand of the operator in which said grip 65 is grasped.

A chute 69 is pivoted at 70 to the discharge end of the platform 48 and provided with a stop 71 which is adapted to engage against the bottom of the platform whereby the latter and the former are maintained in the same general plane. A rocking shaft 72, journaled in bearings on the bars 16 and 17 has one of its ends provided with a crank arm 73, while the opposite end of said shaft carries a bell-crank lever 74, the arm 75 of the latter having pivotal connection with one of the links 58. The crank arm 73 has pivotal connection with the other of said links 58 as shown in Figs. 2 and 3 of the drawings. The arm 76 of the bell-crank lever is pivotally connected with the rear end of a connecting rod 77, while the forward end of said rod is pivotally mounted upon a rocking link 78. A draft member 79 operatively connects the link 78 with an actuating lever 80 upon the wheeled supporting frame of the machine. A belt guide 81 is mounted upon the carrier frame and associated with the lower runs of the belts 34 whereby to guide them properly between the companion rows of forks 42 directly after they leave the material. Preferably, at a point in advance of the belt guide 81 and supported therefrom is a fork straightener 82 including a support 83 and substantially V-elements 84. These elements have shanks 85 which extend through said support 83 and secured thereto by clamping nuts 86. Said elements are disposed in spaced relation with each other and each is extended above the plane of the support 83 and disposed between adjacent belts 34 and provided with upwardly diverging arms 87 whose inner surfaces form guides which are adapted to receive the extremities of the forks 42, whereby to guide them toward the restricted portions of the spaces between the arms, where said forks will be gradually sprung to their original positions, should they become bent in operation. In this manner, it is seen that said forks will be effectually guarded against being caught in the belts as they pass from the spaces between the upper runs thereof and travel into the spaces between the lower runs.

Now that the details of construction of the apparatus are clearly understood it is said that the draft links 13' are connected in any suitable well known manner behind a bean puller, not shown. The machine follows the bean puller and is adapted to travel over two rows whereby when the clutch element 7 is moved into interlocked engagement with the clutch element 8 power will be applied to the collecting chains 41 to move them continuously beneath the plane of the upper runs of the belts 34, the cross slats 36 of the chains 41 being designed to engage against the forward bight portions of the belts 34 to simultaneously impart movements to the belts. When windrowing the platform 48 is adjusted first to the position shown in Figs. 1 and 2 so that as the material leaves said belts 34 it will be deposited onto the platform and then dumped upon the field. It is stated that the machine is adapted to travel down two rows, hence two rows of beans will be dropped on one another. Six rows of beans may be made into one windrow by propelling the machine down rows adjacent to that row where the beans were first dropped, adjustment of the chute 69 and the platform 48 being first made whereby the material discharged therefrom will travel at right angles to the plane of the machine, such adjustment of the parts described being shown in Fig. 5 of the drawing.

Should it be desired to bunch the material after the same is collected the platform 48 and the chute 69 are adjusted to the position shown in Fig. 3. The material is then conducted to the platform and to the chute and is allowed to accumulate thereon until such portion as is required to form the desired bunch is collected. The lever 80 is then adjusted and as a consequence the platform 48 and the chute 69 will be tilted to the position shown in Fig. 1 and the material dropped onto the field. When it is desired to adjust the receiving platform 48 to the position shown in Fig. 5 the links 58 are disconnected from the arcuate guides 56. The clamping nuts of the rod 54 are then adjusted to bear frictionally against the members 56 so that the platform will be held against tilting movement.

We claim:—

1. A machine of the character described comprising endless spaced carrier belts, collecting forks movable in the space between the belts, and means disposed in the path of said forks for straightening the same as they leave the upper runs of said belts whereby the forks will be accurately projected between the lower runs of said belts.

2. A machine of the character described comprising a portable frame, a carrier mounted thereon, a collector carried by the frame, a support mounted upon the frame below the discharge end of the carrier, and means rotatably mounted on the support, a chute mounted on the rotatable means, an arm extending radially from said rotatable means, a link connected with said arm, a controlling rod connected with the link and operable to effect rotation of said rotatable means, a releasing element carried by said rod, the support having a series of recesses therein, and a rocking dog having connection with said releasing element and having a portion operable to engage in the recesses to hold the rotatable means against rotation.

3. In a machine of the character described, a conveyer mechanism, collecting means arranged near the same to supply material thereto embodying a plurality of outwardly extending forks, and means arranged in the path of travel of the forks to straighten the same.

4. In a machine of the character described, a conveyer mechanism having longitudinally extending and laterally spaced openings, collecting means arranged near the conveyer mechanism to supply material thereto and embodying laterally extending forks adapted to extend into the conveyer mechanism openings, and means arranged in the path of travel of the forks to straighten the same.

5. In a machine of the character described, a collecting mechanism embodying a plurality of laterally extending forks, approximately V-shaped elements disposed in the path of travel of the forks to engage therewith, and a conveyer receiving material from the collecting mechanism, substantially as described.

6. In a machine of the character described, an inclined conveyer frame, an endless conveyer arranged within the frame and formed of a plurality of spaced endless belts, an endless collecting belt arranged below the upper longitudinal portion of the endless conveyer and carrying laterally extending conveyer forks extending between the endless belts of the endless conveyer, a plurality of substantially V-shaped elements arranged in advance of the collecting endless belt and disposed in the path of travel of the forks to straighten the same, means to drive the endless conveyer, and means to drive the endless collecting belt.

7. In a machine of the character described, an inclined frame, a plurality of spaced endless belts arranged therein and extending longitudinally thereof, a guide attached to the frame and engaging the lower portion of the belts, an endless take-up belt mounted within the frame wholly within the upper and lower longitudinal portions of the said endless belts and having laterally extending fingers passing upwardly and downwardly between said endless belts, automatically operating means to straighten the fingers during their travel and means to drive the same endless belts and the take-up endless belt.

8. The combination with a wheeled frame, of a conveyer mounted thereon, a chute arranged near the discharge end of the conveyer, an annular track secured to the frame and provided with notches upon its periphery, an annular rotary frame slidably mounted upon the annular track, a crank attached to the rotary frame to move it, a latch lever pivoted to the crank with an extension to enter a selected one of the notches, means to move the latch-lever, means to move the crank, and means connecting the chute and the rotary frame.

9. The combination with a wheeled frame, of a conveyer mounted thereon, a chute arranged near the discharge end of the conveyer, an annular track secured to the frame and provided with notches upon its periphery, an annular rotary frame slidably mounted upon the annular track, a crank attached to the rotary frame to move it, a latch-lever pivoted to the crank with an extension to enter a selected one of the notches, means to move the latch-lever, means to move the crank, means to pivotally connect the chute and rotary frame so that the former may be swung in a vertical plane, and means to swing the chute.

In testimony whereof we affix our signatures in presence of two witnesses.

ALLEN J. TINGLEY.
GLENN GOULD.

Witnesses:
 ROY M. CHROUCH,
 W. M. KILPATRICK.